United States Patent
Kim et al.

(10) Patent No.: US 11,352,294 B2
(45) Date of Patent: Jun. 7, 2022

(54) AMINE-CONTAINING ASPHALT BINDER COMPOSITION

(71) Applicants: SK Innovation Co., Ltd., Seoul (KR); SK Energy Co., Ltd., Seoul (KR)

(72) Inventors: Ki Byung Kim, Daejeon (KR); Bo Ram Jeon, Daejeon (KR); Won Jun Woo, Daejeon (KR); Sang Seob Lee, Daejeon (KR); Min Hee Lee, Daejeon (KR); Haibo Zhao, Spring, TX (US)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 650 days.

(21) Appl. No.: 15/447,810

(22) Filed: Mar. 2, 2017

(65) Prior Publication Data
US 2017/0253528 A1 Sep. 7, 2017

(30) Foreign Application Priority Data
Mar. 4, 2016 (KR) .................. 10-2016-0026248

(51) Int. Cl.
| | | |
|---|---|---|
| C08L 95/00 | (2006.01) |
| C04B 24/12 | (2006.01) |
| C08K 5/16 | (2006.01) |
| C04B 28/04 | (2006.01) |
| E01C 7/14 | (2006.01) |
| E01C 7/18 | (2006.01) |
| C08L 97/00 | (2006.01) |
| C04B 14/04 | (2006.01) |
| C04B 14/28 | (2006.01) |
| C04B 24/36 | (2006.01) |
| C04B 26/26 | (2006.01) |
| C08L 63/00 | (2006.01) |
| C04B 111/00 | (2006.01) |
| C04B 111/27 | (2006.01) |

(52) U.S. Cl.
CPC .......... *C04B 24/122* (2013.01); *C04B 14/048* (2013.01); *C04B 14/28* (2013.01); *C04B 24/36* (2013.01); *C04B 26/26* (2013.01); *C04B 28/04* (2013.01); *C08K 5/16* (2013.01); *C08L 95/00* (2013.01); *C08L 97/005* (2013.01); *E01C 7/14* (2013.01); *E01C 7/18* (2013.01); *C04B 2111/0075* (2013.01); *C04B 2111/27* (2013.01); *C08L 63/00* (2013.01); *C08L 2205/16* (2013.01); *C08L 2555/34* (2013.01); *C08L 2555/52* (2013.01); *C08L 2555/54* (2013.01); *C08L 2555/82* (2013.01); *C08L 2555/84* (2013.01); *C08L 2555/86* (2013.01); *Y02A 30/30* (2018.01); *Y02W 30/91* (2015.05)

(58) Field of Classification Search
CPC ......... C08L 95/00; C09D 195/00; C08K 5/16; C04B 24/122; C04B 14/048; C04B 14/28; C04B 24/36; C04B 26/26; C04B 28/04; C04B 2111/0075; C04B 2111/27; Y02A 30/92; Y02A 30/94; Y02A 30/95; Y02A 30/96; Y02A 30/97; Y02A 30/333
See application file for complete search history.

(56) References Cited

U.S. PATENT DOCUMENTS

| | | | | |
|---|---|---|---|---|
| 3,326,830 A | * | 6/1967 | Szawlowski | C08G 59/54 523/418 |
| 4,499,215 A | * | 2/1985 | Okada | C08L 61/06 523/450 |
| 4,650,000 A | * | 3/1987 | Andreasson | C09K 8/74 166/307 |
| 6,656,977 B2 | * | 12/2003 | Slone | C09D 5/024 162/158 |
| 8,853,306 B2 | * | 10/2014 | Gonzalez Leon | C08L 33/14 524/59 |
| 2004/0204328 A1 | | 10/2004 | Zhang et al. | |
| 2012/0167802 A1 | * | 7/2012 | Huh | C04B 26/26 106/669 |

FOREIGN PATENT DOCUMENTS

| | | | |
|---|---|---|---|
| CN | 1398657 A | 2/2003 | |
| JP | 48014716 A | * 2/1973 | ............. C08L 95/00 |
| JP | 2001131321 A | 5/2001 | |
| KR | 100629902 B1 | 9/2006 | |
| KR | 101354076 B1 | 1/2014 | |
| KR | 101424759 B1 | 8/2014 | |

OTHER PUBLICATIONS

JP 48014716 A Derwent Summary (Year: 2019).*
JP 48014716 A J Plat Pat Machine Translation (Year: 2019).*

* cited by examiner

*Primary Examiner* — Alexandra M Moore
(74) *Attorney, Agent, or Firm* — The Webb Law Firm

(57) ABSTRACT

Provided herein is an asphalt binder composition, and more particularly, an amine-containing asphalt binder composition capable of improving mixability between an asphalt binder and an aggregate, and compactibility and water resistance of an asphalt paving mixture. More particularly, the present invention relates to an asphalt binder composition capable of being used in hot mix asphalt for improving workability and/or stripping-resistance, warm-mix asphalt, recycling of reclaimed asphalt pavement, or the like.

12 Claims, No Drawings

AMINE-CONTAINING ASPHALT BINDER COMPOSITION

CROSS-REFERENCE TO RELATED APPLICATION

This application claims priority to Korean Patent Application No. 10-2016-0026248 filed Mar. 4, 2016, the disclosure of which is hereby incorporated in its entirety by reference.

TECHNICAL FIELD

The following disclosure relates to an asphalt binder composition, and more particularly, to an asphalt binder composition capable of improving mixability, compactibility, and water resistance of asphalt paving mixtures. More particularly, the following disclosure relates to an asphalt binder composition capable of being used in hot mix asphalt for improving workability and/or stripping-resistance, warm-mix asphalt, recycling of reclaimed asphalt pavement, or the like.

BACKGROUND

An asphalt paving mixture is generally being prepared by injecting an asphalt binder into an mixing drum of asphalt plant in which heated aggregates, filler, and the like, are loaded, and mixing these materials at a high temperature of 160 to 180° C., the asphalt paving mixture is paved and compacted on a road, and cooled to room temperature, and then used for a long period of time (several years) in a state in which the asphalt/aggregate mixture is exposed to various environments such as sunlight, rainwater, and the like.

Therefore, high energy is required for preparing the asphalt paving mixture at a high temperature, and harmful gases such as carbon dioxide, sulfur oxides, nitrogen oxides, and the like, may be emitted during preparation of the asphalt paving mixture and construction of asphalt pavement, thereby causing environmental contamination and health problems of workers constructing the asphalt pavement. In addition, since at the time of paving a road, it takes a long time to cool the asphalt/aggregate mixture produced at a high temperature of 160 to 180° C. to room temperature, there are problems in that a traffic opening time may be delayed and workers may be exposed to the risk of safety accident. Further, as the asphalt paving mixture is produced at a high temperature, there is a problem in that oxidation and aging of the asphalt binder relatively rapidly proceed, which causes early cracking of a pavement, such that a lifetime of the pavement may be decreased.

In order to solve these problems, research into a warm-mix asphalt technology (WMA) of mixing and compacting the asphalt paving mixture at a temperature 20 to 40° C. lower than a hot-mix asphalt (HMA) according to the related art has been actively conducted, and development of a warm-mix asphalt additive for the warm-mix asphalt technology having more improved performance has been required.

Describing a recently developed warm-mix asphalt technology, first, there is a warm-mix technology using a chemical foaming agent, which is developed in Japan. This technology is a technology of improving flexibility using micro bubbles by generating and dispersing the micro bubbles, a kind of air entraining (AE) agent, in an asphalt binder, and storing these micro bubbles in the asphalt/aggregate mixture until paving of the asphalt paving mixture is completed. With the warm-mix technology, mixability between the aggregate and the asphalt binder may be improved by the micro bubbles by foaming the asphalt binder, and compactibility may be improved during a paving and compacting process.

However, in this technology, since even after the construction of asphalt pavement is completed, the micro bubbles are not released from the asphalt binder but remain in the asphalt concrete, durability of pavement is deteriorated, such that it is difficult to secure quality. In addition, since it is difficult to manage the asphalt concrete from production to construction of the asphalt concrete, practicality may be deteriorated.

In addition, Sasobit wax is also known as a warm-mix asphalt additive. The Sasobit wax, which is an additive using a hydrocarbon chain mixture produced from coal gas through a Fischer-Tropsch process, is also referred to as FT paraffin wax. It was studied that the Sasobit wax serves to decrease a viscosity of asphalt binder during preparation of asphalt concrete to improve workability and constructability even at a middle temperature.

However, this Sasobit wax, which is a kind of wax-based material, may improve flowability to produce for warm-mix asphalt paving mixture but deteriorate adhesion force between an aggregate and asphalt binder, and water resistance of the constructed asphalt pavement is low, such that in the case in which freezing and thawing are repeated as in winter, a stripping phenomenon that the asphalt binder is stripped from the aggregate may rapidly proceed, thereby causing a pavement damage.

Polyethylene (PE) wax, or the like, which is a low molecular PE, may also produce a warm-mix asphalt paving mixture in the same vein as the Sasobit wax, but does not help in improving quality similarly to the Sasobit wax.

In order to overcome these disadvantages of the wax-based type warm-mix asphalt additive, recently, a case of mixing an amine-based type anti-stripping agent with the wax-based type additive to use the mixture, or a case of developing an amine-based type warm-mix asphalt additive has been increased. However, in this case, there is a problem in that cost is excessively increased, or dynamic stability may be deteriorated.

Therefore, there is a need to develop a material capable of having excellent water resistance and dynamic stability while securing mixability and compactibility of an asphalt paving mixture.

SUMMARY

An embodiment of the present invention is directed to providing a multi-functional asphalt additive capable of having excellent mixability between an asphalt binder and an aggregate, improving compactibility and water resistance of an asphalt paving mixture, and providing asphalt having excellent mechanical properties such as marshall stability, dynamic stability, and the like, and an asphalt binder composition using the same.

Another embodiment of the present invention is directed to providing an asphalt additive capable of enabling mixing, paving, and compacting of asphalt paving mixture at a temperature 20 to 50° C. lower than a temperature of an existing hot mix asphalt, and an asphalt binder composition using the same.

In one general aspect, an asphalt binder composition includes: an additive including a repeating unit represented by the following Chemical Formula 1 and at least one terminal group represented by the following Chemical Formula 2; and an asphalt binder:

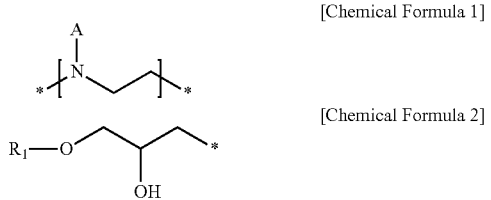

[Chemical Formula 1]

[Chemical Formula 2]

in Chemical Formula 1, A is selected from hydrogen or a functional group represented by Chemical Formula 2, and
in Chemical Formula 2, $R_1$ is $C_1$-$C_{30}$ alkyl.

The additive may have a total amine content of 100 to 1500 mgKOH/g, a viscosity of 1500 to 15000 cSt, the viscosity being measured at 25° C., and a nitrogen/oxygen molar ratio of 0.5 to 4.

The additive may be any one or a mixture of two or more selected from compounds represented by the following Chemical Formula 3:

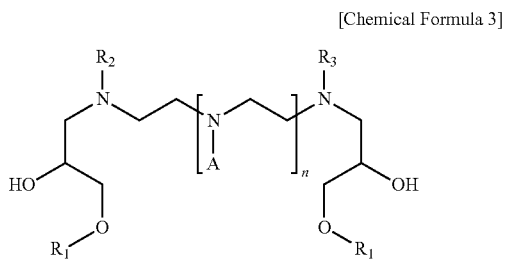

[Chemical Formula 3]

in Chemical Formula 3, n is an integer of 0 to 10,
$R_1$ is $C_1$-$C_{30}$ alkyl,
A, $R_2$, and $R_3$ are each independently selected from hydrogen or

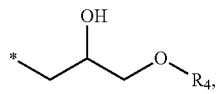

any one or two or more of A, $R_2$, and $R_3$ are necessarily

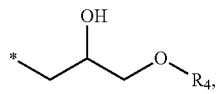

and
$R_4$ is $C_1$-$C_{30}$ alkyl.

The compound represented by Chemical Formula 3 may have a weight average molecular weight of 500 to 1500 g/mol.

The additive may be contained in an amount of 0.05 to 5 parts by weight based on 100 parts by weight of the asphalt binder.

In another general aspect, an asphalt paving mixture includes the asphalt binder composition as described above and an aggregate.

DETAILED DESCRIPTION OF EMBODIMENTS

Hereinafter, an asphalt binder composition according to the present invention will be described in detail with reference to specific examples of the present invention. However, the following detailed examples or exemplary embodiments are only to specifically explain the present invention. Therefore, the present invention is not limited thereto, but may be implemented in various forms.

In addition, unless defined otherwise in the specification, all the technical and scientific terms used in the specification have the same meanings as those that are generally understood by those who skilled in the art. The terms used in the specification are only to effectively describe a specific example, but are not to limit the present invention.

As used herein, the term "asphalt binder composition or asphalt/additive mixture" means a mixture obtained by mixing an asphalt binder with an additive according to the present invention.

As used herein, the term "asphalt paving mixture or asphalt/aggregate mixture" means a mixture obtained by mixing an asphalt binder, an additive according to the present invention, an aggregate, and the like.

In the asphalt binder composition according to the present invention, it is possible to inject the asphalt binder and the additive, respectively, followed by mixing, at the time of preparing the asphalt paving mixture, and it is possible to previously mix the asphalt binder with the additive to inject the asphalt/additive mixture before preparing the asphalt paving mixture.

Hereinafter, an exemplary embodiment of the present invention will be described in detail.

The present inventors found that the additive is used to improve productivity, workability and performance of the asphalt paving mixture by improving mixability, compactibility of the asphalt/aggregate mixture, water resistance thereof, etc., and the above-described effects may be further improved by adjusting a total amine content and a molar ratio between nitrogen and oxygen in the additive within a specific ratio, thereby completing the present invention.

More specifically, according to an exemplary embodiment of the present invention, an asphalt binder composition includes: an additive including a repeating unit represented by the following Chemical Formula 1 and at least one terminal group represented by the following Chemical Formula 2; and an asphalt binder:

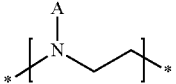

[Chemical Formula 1]

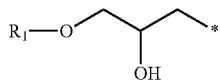

[Chemical Formula 2]

in Chemical Formula 1, A is selected from hydrogen or a functional group represented by Chemical Formula 2, and in Chemical Formula 2, $R_1$ is $C_1$-$C_{30}$ alkyl.

Hereinafter, unless defined otherwise in the present invention, the 'alkyl' includes both a linear type alkyl and a branched type alkyl.

In the exemplary embodiment of the present invention, the repeating unit represented by Chemical Formula 1 may be a unit induced from polyamine, and the functional group represented by Chemical Formula 2 may be a unit induced from alkyl glycidyl ether, wherein in the alkyl glycidyl ether, alkyl may be selected from $C_1$-$C_{30}$, and may be a mixture in which two or more kinds of compounds each having different alkyl are mixed with each other.

The polyamine means any one or a mixture of two or more selected from the group consisting of compounds represented by the following Chemical Formula 4, but is not limited thereto:

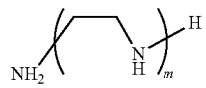

[Chemical Formula 4]

in Chemical Formula 4, m is 1 to 10.

As a more specific example, the polyamine may be any one or a mixture of two or more selected from ethylene diamine, diethylene triamine, triethylene tetramine, tetraethylene pentamine, pentaethylene hexamine, hexaethylene heptamine, heptaethylene octamine, octaethylene nonamine, nonaethylene decamine, and decaethylene undecamine. In addition, an aromatic compound such as aminoethyl piperazine, or the like, may be further included as needed.

More preferably, the polyamine may be a mixture including diethylene triamine, tetraethylene pentamine, pentaethylene hexamine, hexaethylene heptamine, and polyethylene polyamine, and have a number average molecular weight of 250 to 300 g/mol and an amine content of 1100 to 1300 mgKOH/g, but is not limited thereto.

The polyethylene polyamine may mean a polyamine in which m is an integer of 7 to 10 in Chemical Formula 4, or mixtures thereof, but is not limited thereto.

The alkyl glycidyl ether means any one selected from the group consisting of compounds represented by Chemical Formula 5 below, or a mixture in which two or more of compounds each having different alkyl are mixed with each other, but the alkyl glycidyl ether is not limited thereto:

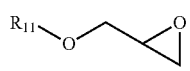

[Chemical Formula 5]

in Chemical Formula 5, $R_{11}$ is $C_1$-$C_{30}$ alkyl.

More preferably, the alkyl glycidyl ether may be a mixture in which a compound having $C_8$-$C_{18}$ alkyl is mixed.

In the exemplary embodiment of the present invention, the additive may be any one or a mixture of two or more selected from compounds represented by the following Chemical Formula 3:

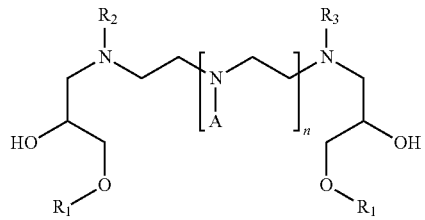

[Chemical Formula 3]

in Chemical Formula 3, n is an integer of 0 to 10, $R_1$ is $C_1$-$C_{30}$ alkyl, A, $R_2$, and $R_3$ are each independently selected from hydrogen or

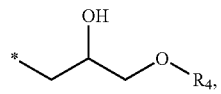

any one or two or more of A, $R_2$, and $R_3$ are necessarily

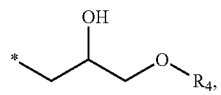

and $R_4$ is $C_1$-$C_{30}$ alkyl.

In the exemplary embodiment of the present invention, in Chemical Formula 3, n is an integer of 0 to 10, more preferably, 3 to 10.

Further, when n is 2 or more, A(s) may be the same as or different from each other, and may be selected from hydrogen or

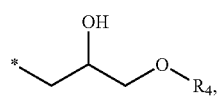

respectively.

In the exemplary embodiment of the present invention, the compound represented by Chemical Formula 3 may have an excellent anti-stripping function, excellent mixability, and excellent compactibility in a range in which a weight average molecular weight thereof is 500 to 1500 g/mol, but the present invention is not limited thereto.

In the exemplary embodiment of the present invention, the additive may have a total amine content of 100 to 1500 mgKOH/g, a viscosity of 1500 to 15000 cSt, the viscosity being measured at 25° C., and a nitrogen/oxygen molar ratio of 0.5 to 4. More specifically, the additive may have a total amine content of 200 to 800 mgKOH/g, a viscosity of 2000 to 13000 cSt, the viscosity being measured at 25° C., and a nitrogen/oxygen molar ratio of 0.7 to 3.5. Within the above-mentioned ranges, the mixability between the asphalt binder and the aggregate, the compactibility of the asphalt/aggregate mixture, the water resistance thereof, etc., may be improved. The above-mentioned ranges may be adjusted depending on the kinds and contents of polyamine and alkyl glycidyl ether.

Among physical properties of the additive, the total amine content may be measured by ASTM D2896, and may have an influence on improving an anti-stripping function of the asphalt binder. When the total amine content is in a range of 100 to 1500 mgKOH/g, and more preferably, 200 to 800 mgKOH/g, the anti-stripping function of the asphalt binder may be improved.

The viscosity may be measured by ASTM D445. It is preferable that the viscosity is in a range in which at the time of preparing an asphalt binder composition or injecting the additive into the asphalt/aggregate mixture in the asphalt plant, the additive may have suitable fluidity at a using condition and miscibility between the asphalt binder and the additive may be improved. Specifically, when the viscosity measured at 25° C. is in a range of 1500 to 15000 cSt, the viscosity measured at 40° C. is in a range of 1000 to 5000 cSt, and the viscosity measured at 60° C. is in a range 300 to 800 cSt, the desirable effects may be implemented.

The nitrogen/oxygen molar ratio may be measured by elementary analysis, and is to confirm an intramolecular distribution ratio between polyamine and alkyl glycidyl ether in the additive. When an oxygen content is increased, mixability and compactibility are improved, and when the nitrogen/oxygen molar ratio is in a range of 0.5 to 4, and more specifically, 0.7 to 3.5, hydrophilicity and hydrophobicity in the molecule are simultaneously obtained, such that miscibility with asphalt binder may be excellent and storage stability may also be improved.

In the exemplary embodiment of the present invention, the asphalt additive may be used in an amount of 0.05 to 5 parts by weight, preferably, 0.1 to 3 parts by weight, and more preferably, 0.1 to 1 part by weight, and further preferably, 0.25 to 0.8 parts by weight based on 100 parts by weight of the asphalt binder. Within the above-mentioned range, the amount of the asphalt additive may be appropriate to improve mixability, compactibility, and water resistance and to have economical efficiency. However, the amount of the asphalt additive is not limited thereto.

In the exemplary embodiment of the present invention, any asphalt binder may be used without limitation as long as it is generally used in the art. In detail, the asphalt binder may include all of natural asphalts and asphalt cements derived from petroleum. For example, as the asphalt binder, any one or a mixture of two or more selected from natural asphalt, petroleum-based asphalt, petroleum-based pitch, oxidized asphalt, reclaimed asphalt, and the like, but the asphalt binder is not limited thereto. The reclaimed asphalt means asphalt extracted from or remaining in reclaimed asphalt pavement.

In addition, the asphalt binder may be modified asphalt binder including a polymer modifier. The polymer modifier may be any one or a mixture of two or more selected from natural rubber, a styrene-butadiene-rubber copolymer, a styrene-butadiene-styrene copolymer, polyethylene, polypropylene, nylon, vinyl chloride, ethylene methacrylate, ethylene propylene rubber, an ethylene vinylacetate copolymer, polybutadiene, polyisoprene, butyl rubber, styrene-butadiene rubber, polychloroprene rubber, waste tire rubber, and the like, but is not limited thereto. The polymer modifier may have a weight average molecular weight of 50,000 to 600,000 g/mol, but is not limited thereto. A content of the polymer modifier may be 0.5 to 15 wt %, more preferably, 2 to 12 wt % in a content of the modified asphalt binder, but is not limited thereto.

In the exemplary embodiment of the present invention, the asphalt binder composition may be used in asphalt mixture selected from the hot mix asphalt mixture, warm-mix asphalt mixture, recycled asphalt mixture using reclaimed asphalt pavement, and foaming asphalt mixture, and the like, but is not limited thereto.

According to another exemplary embodiment of the present invention, an asphalt paving mixture includes the asphalt binder composition as described above and an aggregate. As the aggregate, a natural mineral aggregate, a waste aggregate, and a mixed aggregate thereof may be used. The waste aggregate may be, for example, any one or a mixture of two or more selected from the group consisting of aggregates obtained from industrial wastes such as construction wastes, steel slag, and the like, and reclaimed asphalt pavement. The mixed aggregate of the natural aggregate and the waste aggregate may include 30 to 99.9 wt % of the natural aggregate and 0.1 to 70 wt % of the waste aggregate, but is not limited thereto. Since a content and a size of the aggregate are determined depending on the kind and a air void of pavement to be constructed, ground conditions of a road surface subjected to construction, weather conditions, a traffic volume, the number of lanes, and the like, the content and the size of the aggregate are not limited. As a specific example, the aggregate may be contained in a content of 80 to 99 wt % based on a total weight of the asphalt paving mixture, but is not limited thereto. As the aggregate, a coarse aggregate, a fine aggregate, or the like, may be mixed and used depending on the kind of pavement to be constructed.

The asphalt binder composition according to the present invention includes the multi-functional additive described above, thereby making it possible to improve mixability with the aggregate. Further, in the case of using the waste aggregate such as the aggregated obtained from the reclaimed asphalt pavement, or the like, as well as the natural mineral aggregate, mixability, compactibility, and water resistance of the asphalt/aggregate mixture may be significantly improved. In the exemplary embodiment of the present invention, the asphalt paving mixture may contain the asphalt binder composition in an amount of 1 to 20 wt %, but is not limited thereto.

The asphalt paving mixture includes the asphalt binder, the additive, and the aggregate, and if necessary, any additive may be used without limitation as long as it is generally used in the art. As an example, the additive used in the asphalt paving mixture may be any one or a mixture of two or more selected from a filler, a wax-based type warm-mix asphalt (WMA) additive, an amine-based type warm-mix asphalt (WMA) additive, an anti-stripping agent, rejuvenator and the like, but is not limited thereto. Various additives may be further included in the asphalt paving mixture depending on a target of the pavement to be constructed.

The filler may be any one or a mixture of two or more selected from limestone powder, slaked lime, portland cement, aggregate dust, steel slag dust from a steel manufacturing process, casting dust, fly ash, carbon black, sulfur, lignin, cellulose fiber, nylon fiber, polyester fiber, polyethylene fiber, polypropylene fiber, polyvinylalcohol fiber, natural fiber, and the like, but is not limited thereto. Since a content of the filler may be changed depending on the kind of pavement to be constructed, the content of the filler is not limited. As a specific example, the filler may be contained in a content of 1 to 10 wt % based on the total weight of the asphalt paving mixture, but is not limited thereto.

In the exemplary embodiment of the present invention, the asphalt paving mixture may be used in asphalt concrete pavement selected from dense-graded asphalt concrete pavement, coarse-graded asphalt concrete pavement, Open-graded asphalt concrete pavement, water-permeable asphalt concrete pavement and stone-matrix asphalt concrete pavement, and the like, but is not limited thereto.

In the exemplary embodiment of the present invention, the asphalt paving mixture includes the multi-functional additive described above, such that the asphalt paving mixture may be mixed and paved at a temperature 20 to 50° C. lower than a temperature of an existing hot mix asphalt. In detail, the present invention may provide a warm-mix asphalt paving mixture capable of being paved at 100 to 130° C. In addition, the asphalt paving mixture may be applied to an asphalt binder for reducing potholes and for using reclaimed asphalt pavement.

Hereinafter, Examples and Comparative Examples will be provided in order to describe the present invention in more detail. However, the present invention is not limited to the following Examples.

Hereinafter, physical properties are measured by the following measuring methods.

1) Mixability Between Asphalt Binder and Aggregate

Mixability was measured based on AASHTO T 195-11 Standard Method of Test for Determining Degree of Particle Coating of Asphalt Mixtures. In detail, after an asphalt binder composition and an aggregate were weighed so that a weight of an asphalt/aggregate mixture was about 2.5 kg, and the asphalt binder composition and the aggregate were mixed at 125° C. for 2 minutes. Then, the mixture was filtered through a sieve (9.5 mm), and a ratio of coated aggregate was measured based on a total amount of coarse aggregates remaining on the sieve.

2) Compactibility of Asphalt Paving Mixture

Compactibility was measured based on a compactibility test method using a superpave gyratory compactor (SGC) disclosed in NCHRP Report 691 Mix Design Practices for Warm-mix Asphalt. More specifically, an asphalt binder composition and an aggregate were mixed at 125° C. for 2 minutes, put into a mold having a diameter of 101.6 mm, and the number of compaction processes until a air void was 7% was measured at 115° C. using the SGC.

3) Water Resistance (Aggregate Coverage Rate (%) after Dynamic Immersion)

Water resistance was measured based on EN-12697-11 Determination of the Affinity Between Aggregate and Bitumen. More specifically, 510 g of aggregates (11.2 to 8 mm) and 16 g of an asphalt binder composition were mixed at mixing temperatures suggested in Examples or Comparative Examples for 3 minutes and cooled at room temperature. Thereafter, 150 g of the asphalt/aggregate mixture was collected and put into a test glass bottle filled with water and rotated at 60 rpm for 24 hours, and+ then, an amount of the asphalt binder covered on the aggregate was evaluated by the naked eyes.

4) Water Resistance (Tensile Strength Ratio (%) after Water Immersion)

Water resistance was measured based on a test method disclosed in AASHTO T 283 Resistance of Compacted Asphalt Mixtures to Moisture-Induced Damage. In detail, after an asphalt binder composition and an aggregate were mixed at 160° C. for 2 minutes, put into a mold having a diameter of 101.6 mm, and subjected to gyratory compaction at 140° C. until a air void was 7±1%, thereby preparing a test sample. Tensile strength of the test sample before and after water immersion were measured, and compared.

5) Rutting Resistance (Dynamic Stability (Times/Mm))

Rutting resistance was measured based on a wheel tracking test method of an asphalt paving mixture (KS F 2374). In detail, after an asphalt binder composition and an aggregate were mixed at 125° C. for 2 minutes, put into a mold having a size of 300×300×50 mm (length×width×height), and subjected to compaction at 115° C. until a air void was 4±1%, thereby preparing a test sample. The number of passes of the wheel required until the test sample was rutted by 1 mm at 60° C. after 45 minutes was evaluated.

6) Fatigue Crack Resistance

Fatigue crack resistance was measured based on a test method disclosed in Proposed Standard Practice for Uniaxial Repeated Fatigue Test of Compacted Hot-Mix Asphalt reported in NCHRP Project No. NCHRP 9-44A Validating an Endurance Limit for HMA Pavements. In detail, after an asphalt binder composition and an aggregate were mixed at 160° C. for 2 minutes, a test sample having a diameter of 100 mm and a height of 150 mm was prepared at 140° C. Then, repeated load is applied to the test sample at 19° C. and 10 Hz, and the number of repeated loads up to fracture of the test sample was measured.

7) Total Amine Content (mgKOH/g)

A total amine content was measured according to ASTM D2896.

8) Viscosity

A viscosity was measured according to ASTM D445.

9) N/O Molar Ratio

A nitrogen/oxygen (N/O) molar ratio was calculated from a nitrogen content of polyamine and an oxygen content of alkyl glycidyl ether.

10) Weight Average Molecular Weight (g/mol)

A weight average molecular weight was measured according to ASTM D5296.

Preparation Example

1) Preparation of Additives 1 to 3

Additives 1 to 3 were prepared by reacting polyamine and alkyl glycidyl ether with each other.

As the polyamine, which was a mixture including diethylene triamine, tetraethylene pentamine, pentaethylene hexamine, hexaethylene heptamine, and polyethylene polyamine represented by the following Chemical Formula 6, a mixture having a number average molecular weight of 250 to 300 g/mol and an amine content of 1257 mgKOH/g was used:

[Chemical Formula 6]

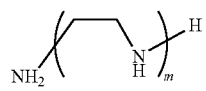

in Chemical Formula 6, m is 7 to 10.

As the alkyl glycidyl ether, a mixture mixed at the content as illustrated in the following Table 1 was used.

TABLE 1

| | Carbon Atoms | | | | | |
|---|---|---|---|---|---|---|
| | $C_8$ | $C_{10}$ | $C_{12}$ | $C_{14}$ | $C_{16}$ | $C_{18}$ |
| wt % | <0.3 | <1 | <65 | 21~28 | 4~8 | 0.5 |

The additive 1 was prepared by reacting 20 wt % of the polyamine mixture and 80 wt % of the alkyl glycidyl ether of Table 1 with each other.

The additive 2 was prepared by reacting 35 wt % of the polyamine mixture and 65 wt % of the alkyl glycidyl ether of Table 1 with each other.

The additive 3 was prepared by reacting 50 wt % of the polyamine mixture and 50 wt % of the alkyl glycidyl ether of Table 1 with each other.

Physical properties of the prepared additives 1 to 3 were measured and illustrated in the following Table 2.

TABLE 2

| Classification of Additive | Additive 1 | Additive 2 | Additive 3 |
|---|---|---|---|
| Total Amine Content (mgKOH/g) | 250 | 420 | 630 |
| Viscosity (cSt, 25° C.) | 7748 | 11331 | 2477 |
| N/O Molar Ratio | 0.83 | 1.79 | 3.32 |
| Weight Average Molecular Weight (g/mol) | 1474 | 831 | 574 |

Example 1

1) Preparation of Asphalt Binder Composition

An asphalt binder composition was prepared by adding 0.5 parts by weight of the additive 1 of Table 2 based on 100 parts by weight of a petroleum-based asphalt binder having a penetration of 72 dmm at 25° C., and stirring the mixture at a rate of 400 rpm at 150° C. for 5 minutes.

2) Preparation of Asphalt/Aggregate Mixture and Test Sample

An asphalt/aggregate mixture was prepared by mixing 4.7 wt % of the prepared asphalt binder composition and 95.3 wt % of a mixture of a granite gneiss aggregate (WC-3) and a limestone filler with each other at 125° C.

As the granite gneiss aggregate, a granite gneiss aggregate satisfying aggregate standards according to KS F 2357 was used, and as the limestone filler, a limestone filler satisfying filler standards according to KS F 3501 was used. The WC-3, which is a standard suggested by Korean Ministry of Land, Infrastructure and Transport, is a dense-graded mix with 20 mm nominal maximum aggregate size.

The asphalt/aggregate mixture was compacted at 115° C., thereby preparing a test sample.

Physical properties thereof were measured and illustrated in the following Table 3.

Example 2

Example 2 was performed by the same method as Example 1 except for using the additive 2 of Table 2 at the time of preparing the asphalt binder composition in Example 1.

Physical properties thereof were measured and illustrated in the following Table 3.

Example 3

Example 3 was performed by the same method as Example 1 except for using the additive 3 of Table 2 at the time of preparing the asphalt binder composition in Example 1.

Physical properties thereof were measured and illustrated in the following Table 3.

Example 4

Example 4 was performed by the same method as Example 1 except for using 0.25 parts by weight of the additive 2 of Table 2 at the time of preparing the asphalt binder composition in Example 1.

Physical properties thereof were measured and illustrated in the following Table 3.

Example 5

Example 5 was performed by the same method as Example 1 except for using 0.8 parts by weight of the additive 2 of Table 2 at the time of preparing the asphalt binder composition in Example 1.

Physical properties thereof were measured and illustrated in the following Table 3.

Comparative Example 1

Comparative Example 1 was performed by the same method as Example 1 except that the additive was not used at the time of preparing the asphalt binder composition in Example 1.

That is, an asphalt/aggregate mixture was prepared by mixing 4.7 wt % of a petroleum-based asphalt binder having a penetration of 72 dmm at 25° C. and 95.3 wt % of a mixture of a granite gneiss aggregate satisfying WC-3 and a limestone filler with each other at 125° C.

The asphalt/aggregate mixture was compacted at 115° C., thereby preparing a test sample.

Physical properties thereof were measured and illustrated in the following Table 3.

TABLE 3

| Classification | | Quality Standards | Comparative Example 1 | Example 1 | Example 2 | Example 3 | Example 4 | Example 5 |
|---|---|---|---|---|---|---|---|---|
| Additive Content (Parts by Weight) | | | 0 | 0.5 | 0.5 | 0.5 | 0.25 | 0.8 |
| Mixability between Asphalt Binder and Aggregate | Coating Rate (2 minutes @125° C.) (%) | 95 or more | 92.5 | 100 | 99.5 | 98.3 | 97.5 | 100 |
| Compactibility of Asphalt/Aggregate Mixture | Number of Compact Processes (air void: 7% @115° C.), (times) | — | 19.5 | 13.0 | 16.8 | 18.0 | 18.2 | 13.0 |
| Water Resistance of Asphalt/Aggregate Mixture | Aggregate Coverage Rate after Dynamic immersion (%) | 50 or more | 5 | 50 | 55 | 60 | 45 | 65 |

TABLE 3-continued

| Classification | | Quality Standards | Comparative Example 1 | Example 1 | Example 2 | Example 3 | Example 4 | Example 5 |
|---|---|---|---|---|---|---|---|---|
| Rutting Resistance of Asphalt/Aggregate Mixture | Dynamic Stability (times/mm) | 750 or more | 486 | 876 | 814 | 774 | 720 | 760 |

As shown in Table 3, it was confirmed that in Examples 1 to 3 to which the additive was applied, mixability between the asphalt binder and the aggregate, compactibility of the asphalt/aggregate mixture, and water resistance were significantly improved as compared to Comparative Example 1 to which the additive was not applied.

In addition, as the nitrogen/oxygen (N/O) molar ratio was increased, and the weight average molecular weight was decreased, an effect of improving the water resistance was continuously increased. Meanwhile, the mixability between the asphalt binder and the aggregate, and the compactibility of the asphalt/aggregate mixture were decreased. From the results, it could be appreciated that the water resistance, the mixability, and the compactibility were different depending on chemical structures of the additives, and accordingly, it is thought that it is important to consider simultaneously the mixability, the compactibility, and the water resistance when designing the chemical structures.

Further, upon comparing Example 2 with Examples 4 and 5 in which the same additive was used, it was confirmed that as the additive content was increased, a coating rate at which the asphalt binder was coated on the aggregate was increased, such that an effect of improving the mixability was provided.

In addition, as the additive was added and the additive content was increased, the number of compact processes required for compacting up to the same air void was decreased, thereby confirming that an effect of improving the compactibility was implemented, and the aggregate coverage rate after dynamic immersion was increased, thereby confirming that an effect of improving water resistance was high.

Example 6

A warm mix asphalt binder composition was prepared by adding 0.5 parts by weight of the additive 2 of Table 2 based on 100 parts by weight of a petroleum-based asphalt binder having a penetration of 68 dmm at 25° C., and stirring the mixture at a rate of 400 rpm at 150° C. for 5 minutes.

A test sample was prepared by mixing 5.2 wt % of the prepared asphalt binder composition and 94.8 wt % of a mixture of a granite gneiss aggregate satisfying WC-2 and a limestone filler with each other at 125° C. for 2 minutes, and compacting the mixture at 115° C.

As the granite gneiss aggregate, a granite gneiss aggregate satisfying aggregate standards according to KS F 2357 was used, and as the limestone filler, a limestone filler satisfying filler standards according to KS F 3501 was used. The WC-2, which is a standard suggested by Korean Ministry of Land, Infrastructure and Transport, is a dense-graded mix with 13 mm nominal maximum aggregate size.

Physical properties thereof were measured and illustrated in the following Table 4.

Comparative Example 2

Comparative Example 2 was performed by the same method as Example 6 except for using an alkylamine-based additive (MeadWestvaco Corporation, Evotherm™ M1) instead of using the additive 2 in Example 6.

Physical properties thereof were measured and illustrated in the following Table 4.

Comparative Example 3

Comparative Example 3 was performed by the same method as Example 6 except for using 1.5 parts by weight of a wax-based type additive (SASOL, Sasobit) instead of using the additive 2 in Example 6.

Physical properties thereof were measured and illustrated in the following Table 4.

Comparative Example 4

Comparative Example 4 was performed by the same method as Example 6 except for using 1.5 parts by weight of an additive (AkzoNobel, Rediset WMX8017) in which a wax-based type additive and an amine-based type additive were mixed with each other instead of using the additive 2 in Example 6.

Physical properties thereof were measured and illustrated in the following Table 4.

TABLE 4

| Classification | Quality Standards | Example 6 | Comparative Example 2 | Comparative Example 3 | Comparative Example 4 |
|---|---|---|---|---|---|
| Mixability between Asphalt Binder and Aggregate (Coating Rate (2 minutes @125° C.)), (%) | 95 or more | 99.8 | 99.6 | 99.6 | 100 |
| Compactibility of Asphalt/Aggregate Mixture (Number of Compact Processes (air void: 7% @115° C.)), (times) | — | 15.4 | 16.2 | 17.0 | 14.8 |

TABLE 4-continued

| Classification | Quality Standards | Example 6 | Comparative Example 2 | Comparative Example 3 | Comparative Example 4 |
|---|---|---|---|---|---|
| Water Resistance (Aggregate Coverage Rate after Dynamic immersion), (%) | 50 or more | 55 | 50 | 5 | 10 |
| Rutting Resistance (Dynamic Stability) (times/mm) | 750 or more | 825 | 732 | 1,500 | 756 |

As shown in Table 4, it could be appreciated that there was no significant difference between Comparative Examples and Examples in view of mixability and the compactibility of the asphalt/aggregate mixture; however, in view of water resistance and rutting resistance that are main requirements for road performance of the asphalt paving mixture, Example 6 to which the additive according to the present invention was applied had generally excellent results.

In particular, it was confirmed that Comparative Example 3 in which the wax-based additive was used and Comparative Example 4 in which the additive obtained by mixing the wax-based type additive and the amine-based type additive with each other was used failed to meet the standard of the water resistance, and it was confirmed that Comparative Example 2 in which the alkylamine-based additive was used failed to meet the standard of rutting resistance.

Example 7

An asphalt binder composition for reducing potholes was prepared by adding 0.5 parts by weight of the additive 2 of Table 2 based on 100 parts by weight of a petroleum-based asphalt binder having a penetration of 73 dmm at 25° C., and stirring the mixture at a rate of 400 rpm at 150° C. for 5 minutes.

A test sample was prepared by mixing 4.4 wt % of the prepared asphalt binder composition and 95.6 wt % of a mixture of a granite gneiss aggregate (WC-5) and a limestone filler with each other at 160° C. for 2 minutes, and compacting the mixture at 140° C.

As the granite gneiss aggregate, a granite gneiss aggregate satisfying aggregate standards according to KS F 2357 was used, and as the limestone filler, a limestone filler satisfying filler standards according to KS F 3501 was used. The WC-5, which is a standard suggested by Korean Ministry of Land, Infrastructure and Transport, is a rut-resistance mix with 20 mm nominal maximum aggregate size.

Physical properties thereof were measured and illustrated in the following Table 5.

Comparative Example 5

Comparative Example 5 was performed by the same method as Example 7 except that the additive was not used in Example 7.

That is, a test sample was prepared by mixing 4.4 wt % of a petroleum-based asphalt binder having a penetration of 73 dmm at 25° C. and 95.6 wt % of a mixture of a granite gneiss aggregate (WC-5) and a limestone filler with each other at 160° C. for 2 minutes, and compacting the mixture at 140° C.

Physical properties thereof were measured and illustrated in the following Table 5.

TABLE 5

| Classification | Quality standard | Example 7 | Comparative Example 5 |
|---|---|---|---|
| Water Resistance (Aggregate Coverage Rate after Dynamic immersion) (%) | 50 or more | 55 | 10 |
| Water Resistance (Tensile Strength Ratio after Water immersion) (%) | 80 or more | 88 | 55 |

As shown in Table 5, it could be appreciated that in view of the aggregate coverage rate after dynamic immersion and the tensile strength ratio after water immersion indicating water resistance of the asphalt/aggregate mixture, Example 7 to which the additive according to the present invention was applied had significantly excellent results. This result may mean that in the case of using the additive according to the present invention, the asphalt binder composition may be utilized for reducing the potholes occurring on the road, in addition to being used for preparing the asphalt paving mixture and for reducing a temperature at the time of mixing and compacting the asphalt/aggregate mixture.

Example 8

An asphalt binder composition was prepared by adding 0.5 parts by weight of the additive 2 of Table 2 based on 100 parts by weight of a petroleum-based asphalt binder having a penetration of 73 dmm at 25° C., and stirring the mixture at a rate of 400 rpm at 150° C. for 5 minutes.

A test sample was prepared by mixing 3.5 wt % of the prepared asphalt binder composition, 30 wt % of reclaimed asphalt pavement, and 66.5 wt % of a mixture of a granite gneiss aggregate (1-20) and a limestone filler with each other at 160° C. for 2 minutes, and compacting the mixture at 140° C.

As the reclaimed asphalt pavement, which satisfies quality standard of Waste Aggregate for asphalt concrete determined by Ministry of Land, Infrastructure and Transport, a reclaimed asphalt pavement in which a content of remaining asphalt binder was 4 wt % and a penetration of the remaining asphalt binder at 25° C. was 28 dmm was used.

As the granite gneiss aggregate, a granite gneiss aggregate satisfying aggregate standards according to KS F 2357 was used, and as the limestone filler, a limestone filler satisfying filler standards according to KS F 3501 was used.

Here, 1-20, which is a standard suggested by Korean Agency for Technology and Standards, is a coarse-graded mix with 20 mm nominal maximum aggregate size.

Physical properties thereof were measured and illustrated in the following Table 6.

Comparative Example 6

Comparative Example 6 was performed by the same method as Example 8 except that the additive was not used in Example 8.

That is, a test sample was prepared by mixing 3.5 wt % of a petroleum-based asphalt binder having a penetration of 73 dmm at 25° C., 30 wt % of reclaimed asphalt pavement, and 66.5 wt % of a mixture of a granite gneiss aggregate satisfying (1-20) and a limestone filler with each other at 160° C. for 2 minutes, and compacting the mixture at 140° C.

Physical properties thereof were measured and illustrated in the following Table 6.

TABLE 6

| Classification | Example 8 | Comparative Example 6 |
|---|---|---|
| Fatigue Cracking Test (Number of Repeated Loads until Sample Was Destroyed) (times) | 60,000 or more | 25,000 |

As shown in Table 6, it could be appreciated that in view of the number of repeated loads until the sample was destroyed, i.e., fatigue cracking resistance of the asphalt/aggregate mixture, Example 8 to which the additive according to the present invention was applied had excellent results, that is, about 2.4 times or more higher than that of Comparative Example 6 to which the additive was not applied. This result means that in the case of using the additive according to the present invention together with the reclaimed asphalt pavement, early cracking of a pavement, which is the biggest problem at the time of applying the reclaimed asphalt pavement, may be prevented, thereby increasing a lifetime of the road.

Examples 9 to 17

Examples 9 to 17 were performed by the same method as Example 1 except for changing the content of the additive 1 of Table 2 to be 0.05 parts by weight to 5 parts by weight at the time of preparing the asphalt binder composition. Physical properties thereof were measured and illustrated in the following Table 7.

TABLE 7

| Classification | Quality Standards | Example 9 | Example 10 | Example 11 | Example 12 | Example 13 | Example 14 | Example 15 | Example 16 | Example 17 |
|---|---|---|---|---|---|---|---|---|---|---|
| Additive Content (Parts by Weight) | | 0.05 | 0.1 | 0.25 | 0.8 | 1.0 | 2.0 | 3.0 | 4.0 | 5.0 |
| Mixability between Asphalt Binder and Aggregate (Coating Rate (2 minutes @125° C.)), (%) | 95 or more | 96.2 | 96.8 | 100 | 100 | 100 | 100 | 100 | 100 | 100 |
| Compactibility of Asphalt/Aggregate Mixture (Number of Compact Processes (air void: 7% @115° C.)), (times) | — | 18.8 | 18.5 | 13.2 | 12.8 | 12.2 | 11.3 | 10.5 | 10.3 | 10.2 |
| Water Resistance of (Aggregate Coverage Rate after Dynamic immersion (%) | 50 or more | 35 | 40 | 50 | 55 | 70 | 75 | 80 | 80 | 80 |
| Rutting Resistance (Dynamic Stability (times/mm) | 750 or more | 512 | 634 | 790 | 850 | 732 | 628 | 530 | 424 | 286 |

As shown in Table 7, it could be appreciated that as the content of the additive according to the present invention was increased, mixability between the asphalt binder and the aggregate was increased, and compactibility of the asphalt/aggregate mixture was decreased. In addition, it could be appreciated that water resistance was increased, and rutting resistance was gradually increased, but decreased again.

It could be appreciated that since in Examples 9 and 10, only a small content of the additive was used, Examples 9 and 10 failed to meet the quality standard; however, physical properties of Examples 9 and 10 were significantly improved as compared to those of Comparative Example 1 in which the additive was not used.

The asphalt binder composition according to the present invention may improve productivity, workability, and performance of the asphalt/aggregate mixture by improving mixability between the aggregate and the asphalt binder, compactibility, water resistance, rutting resistance, fatigue crack resistance, and the like, of the asphalt paving mixture.

Further, in the case of providing the asphalt binder composition containing the asphalt additive according to the present invention, asphalt pavement having high water resistance due to high tensile strength after water immersion or freezing-thawing, and having excellent rutting resistance due to high dynamic stability may be constructed.

What is claimed is:

1. An asphalt binder composition comprising:
   an additive including a repeating unit represented by the following Chemical Formula 1 and at least one terminal group represented by the following Chemical Formula 2, wherein the additive has a total amine content of 100 to 1500 mg KOH/g, a viscosity of 1500 to 15000 cSt, the viscosity being measured at 25° C., and a nitrogen/oxygen molar ratio of 0.5 to 4, and the additive is contained in an amount of 0.25 to 0.8 parts by weight based on 100 parts by weight of the asphalt binder; and
   an asphalt binder:

[Chemical Formula 1]

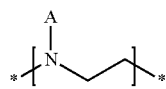

[Chemical Formula 2]

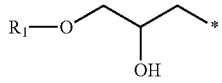

in Chemical Formula 1, A is selected from hydrogen or a functional group represented by Chemical Formula 2, and in Chemical Formula 2, $R_1$ is $C_1$-$C_{30}$ alkyl.

2. The asphalt binder composition of claim 1, wherein the additive is any one or a mixture of two or more selected from compounds represented by the following Chemical Formula 3:

[Chemical Formula 3]

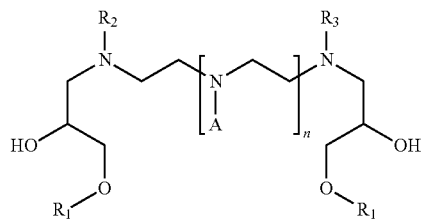

in Chemical Formula 3, n is an integer of 0 to 10, $R_1$ is $C_1$-$C_{30}$ alkyl,
   A, $R_2$, and $R_3$ are each independently selected from hydrogen or

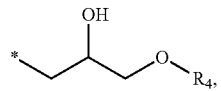

any one or two or more of A, $R_2$, and $R_3$ are necessarily

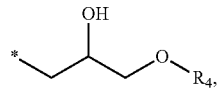

and
   $R_4$ is $C_1$-$C_{30}$ alkyl.

3. The asphalt binder composition of claim 2, wherein the compound represented by Chemical Formula 3 has a weight average molecular weight of 500 to 1500 g/mol.

4. The asphalt binder composition of claim 1, wherein the asphalt binder is any one or a mixture of two or more selected from natural asphalt, petroleum-based asphalt, petroleum-based pitch, oxidized asphalt, and reclaimed asphalt.

5. The asphalt binder composition of claim 4, wherein the asphalt binder is a modified asphalt binder further including a polymer modifier.

6. The asphalt binder composition of claim 5, wherein the polymer modifier is any one or a mixture of two or more selected from natural rubber, a styrene-butadiene- rubber copolymer, a styrene-butadiene-styrene copolymer, polyethylene, polypropylene, nylon, vinyl chloride, ethylene methacrylate, ethylene propylene rubber, an ethylene vinylacetate copolymer, polybutadiene, polyisoprene, butyl rubber, styrene-butadiene rubber, polychloroprene rubber, and waste tire rubber.

7. The asphalt binder composition of claim 1, wherein the asphalt binder composition is used in a hot mix asphalt mixture, a warm-mix asphalt mixture, a recycled asphalt mixture using reclaimed asphalt pavement, or a foaming asphalt mixture.

8. An asphalt paving mixture comprising the asphalt binder composition of claim 1; and an aggregate.

9. The asphalt paving mixture of claim 8, further comprising a filler,
   wherein the filler is any one or a mixture of two or more selected from limestone powder, slaked lime, portland cement, aggregate dust, steel slag dust, casting dust, fly ash, carbon black, sulfur, lignin, cellulose fiber, nylon fiber, polyester fiber, polyethylene fiber, polypropylene fiber, polyvinylalcohol fiber, and natural fiber.

10. The asphalt paving mixture of claim 8, wherein the aggregate is selected from a natural mineral aggregate, a reclaimed asphalt pavement, and a mixed aggregate thereof.

11. The asphalt paving mixture of claim 10, wherein the mixed aggregate includes 0.1 to 70 wt % of reclaimed asphalt pavement.

12. The asphalt paving mixture of claim 8, wherein the asphalt paving mixture is used in asphalt concrete pavement selected from dense-graded asphalt concrete pavement, coarse-graded asphalt concrete pavement, open-graded asphalt concrete pavement, water-permeable asphalt concrete pavement and stone-matrix asphalt concrete pavement.

* * * * *